(12) United States Patent
Hawes

(10) Patent No.: US 6,435,462 B2
(45) Date of Patent: Aug. 20, 2002

(54) UNIVERSAL BRACKET MOUNT

(75) Inventor: Timothy R. Hawes, Muskegon, MI (US)

(73) Assignee: Fleet Engineers, Incorporated, Muskegon, MI (US)

( * ) Notice: Subject to any disclaimer, the term of this patent is extended or adjusted under 35 U.S.C. 154(b) by 0 days.

(21) Appl. No.: 09/738,155

(22) Filed: Dec. 15, 2000

Related U.S. Application Data

(60) Provisional application No. 60/172,906, filed on Dec. 21, 1999.

(51) Int. Cl.$^7$ .............................. A47F 5/00; A47H 1/10
(52) U.S. Cl. .............................. 248/299.1; 248/297.31; 248/292.14
(58) Field of Search ....................... 248/292.14, 297.21, 248/225.11, 299.1, 297.2; 403/84, 87, 16

(56) References Cited

U.S. PATENT DOCUMENTS

| | | | | |
|---|---|---|---|---|
| 4,436,270 A | * | 3/1984 | Muraishi | 248/416 |
| 4,605,238 A | * | 8/1986 | Arenhold | 248/154.5 |
| 4,733,879 A | * | 3/1988 | Arenhold | 280/154.5 |
| 5,833,206 A | * | 11/1998 | Peacock | 248/677 |
| 5,884,941 A | * | 3/1999 | Bolin | 280/851 |
| 5,915,708 A | * | 6/1999 | Silva | 280/154 |
| 5,938,222 A | * | 8/1999 | Huang | 280/154 |
| 6,000,757 A | * | 12/1999 | Sovis | 297/344.1 |
| 6,045,103 A | * | 4/2000 | Costa | 248/278.1 |
| 6,076,842 A | * | 6/2000 | Knoer | 280/154 |

* cited by examiner

Primary Examiner—Leslie A. Braun
Assistant Examiner—Amy J. Sterling
(74) Attorney, Agent, or Firm—McGarry Bair LLP

(57) ABSTRACT

A universal mudflap bracket mount for mounting a mudflap bracket to a vehicle frame, the bracket mount comprising a frame-mounting block having two opposing surfaces and a frame-mounting opening passing through the frame-mounting block transverse to the surfaces, a bracket-mounting plate having opposing faces, the bracket-mounting plate faces being parallel, at least one of the block surfaces being spaced outwardly from one of the plate faces to accommodate a bolt head, and openings in the bracket-mounting plate for receiving two fasteners of a mudflap bracket, at least one of the openings being arcuate in shape for adjustment of the angular position of the bracket mount with respect to the mudflap bracket.

21 Claims, 3 Drawing Sheets

1

UNIVERSAL BRACKET MOUNT

CROSS REFERENCE TO RELATED APPLICATION

This application claims the benefit of U.S. provisional patent application Ser. No. 60/172,906, filed Dec. 21, 1999.

BACKGROUND OF THE INVENTION

1. Field of the Invention

The invention relates to adapters for mounting brackets such as mudflap brackets to a vehicle frame. In one of its aspects, the invention relates to a mudflap bracket adapter that accommodates mudflap brackets with different spaced holes. In another of its aspects, the invention relates to a mudflap bracket adapter that uses a single vehicle frame mounting hole where a conventional two-hole mount is either unavailable or undesirable. In yet another of its aspects, the invention relates to a mudflap bracket adapter that mounts a mudflap for adjustment with respect to the vehicle frame.

2. Description of the Related Art

Mudflap brackets are mounted to a vehicle frame with a pair of threaded bolts or studs through a complementary pair of apertures provided in the frame. It is a common occurrence, however, for these apertures to be obstructed, or not available in the location desired by the installer. The installer must drill holes in the frame at the appropriate location, or find a way around the obstruction. Various adapting mounts are known, though these are generally of a single-position or non-adjustable nature.

SUMMARY OF THE INVENTION

The invention relates to a universal mudflap bracket mount for mounting a mudflap bracket to a vehicle frame. The bracket mount comprises a frame-mounting block and a bracket-mounting plate. The frame-mounting block has two opposing faces and a frame-mounting opening transverse to the surfaces.

The bracket-mounting plate preferably has parallel opposing faces. At least one of the block faces is spaced inwardly from one of the plate faces to accommodate a bolt head between the face plate and a vehicle frame when the mounting block is mounted to a vehicle frame. The bracket-mounting plate also includes mudflap fastener openings for receiving two fasteners of a mudflap bracket. At least one of the mudflap fastener openings is arcuate in shape for adjustment of the angular position of the bracket mount with respect to the mudflap bracket. To this end, the arcuate opening has a radius of curvature with a center in another of the mudflap fastener openings.

In one embodiment, the bracket mount also includes a retainer for selectively retaining the bracket mount in a selected orientation with respect to the vehicle frame about an axis passing through the frame-mounting opening.

In another embodiment, the retainer comprises at least one threaded opening in one of the bracket-mounting plate and the frame-mounting block and a setscrew threaded into the threaded opening.

In still another embodiment, the retainer comprises a pair of threaded openings in one of the bracket-mounting plate and the frame mounting block and setscrews threaded into the threaded openings.

DETAILED DESCRIPTION OF THE PREFERRED EMBODIMENT

Figure 1:
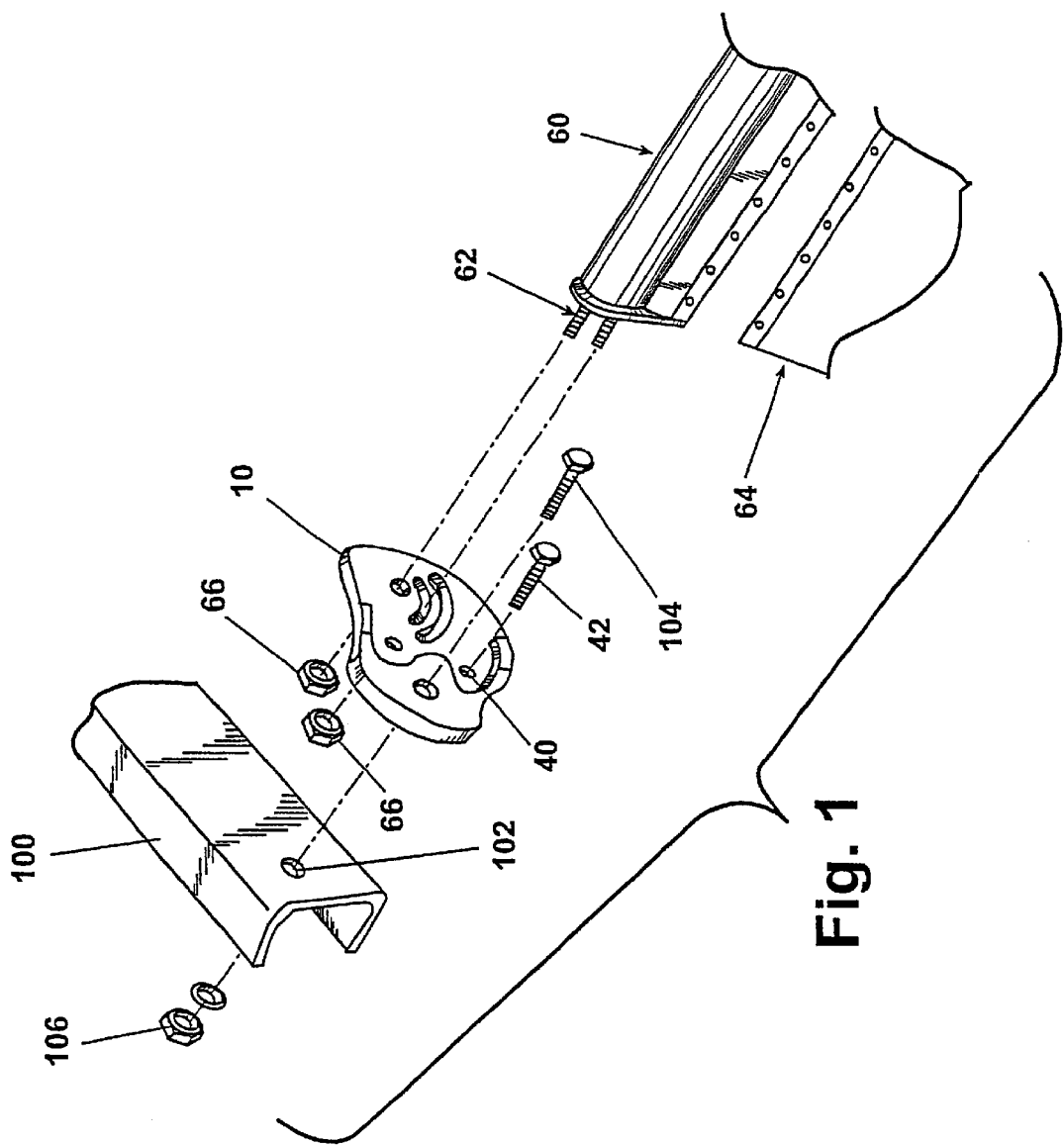
FIG. 1 is an exploded perspective view of a universal bracket mount according to the invention, a mudflap and bracket, and a vehicle frame.
Figure 2:
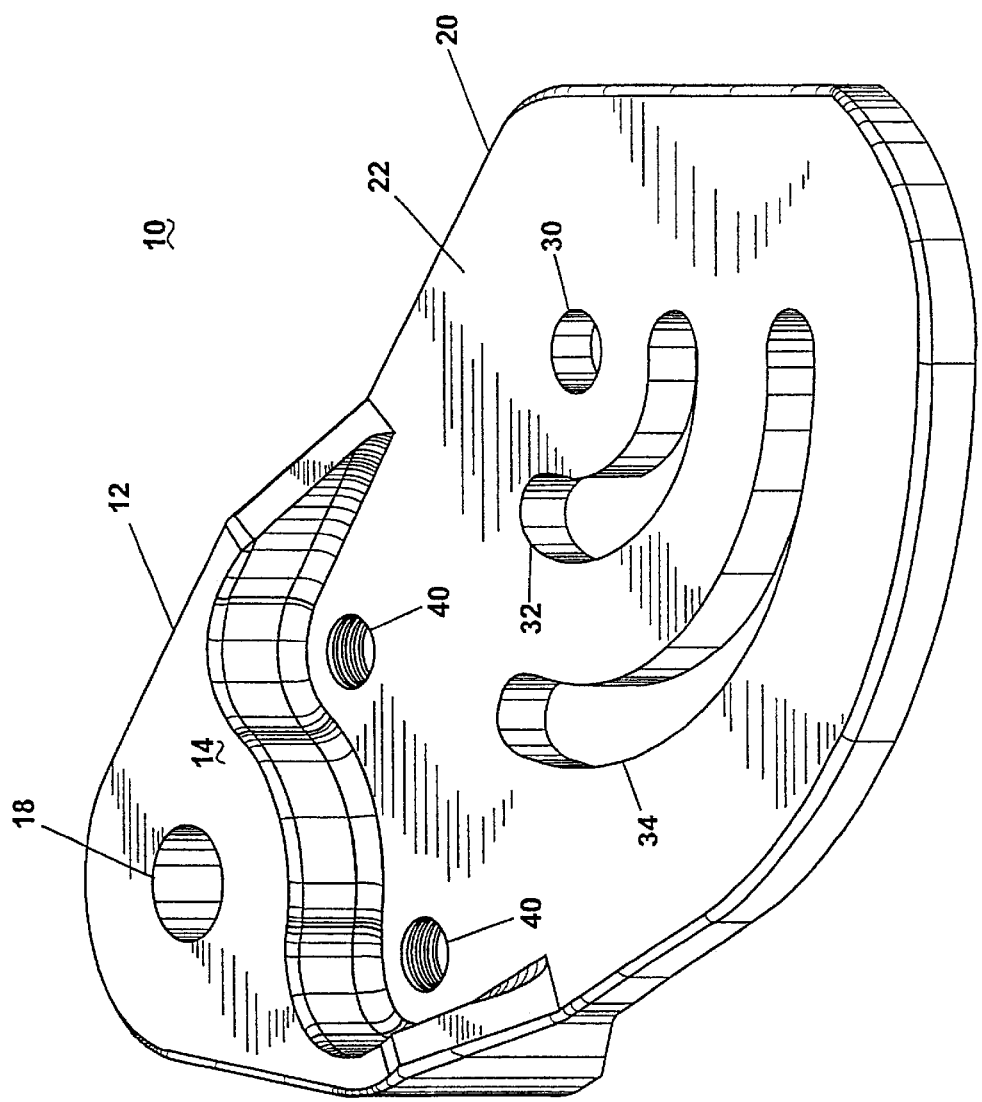
FIG. 2 is a perspective view of the universal bracket mount according to the invention.
Figure 3:
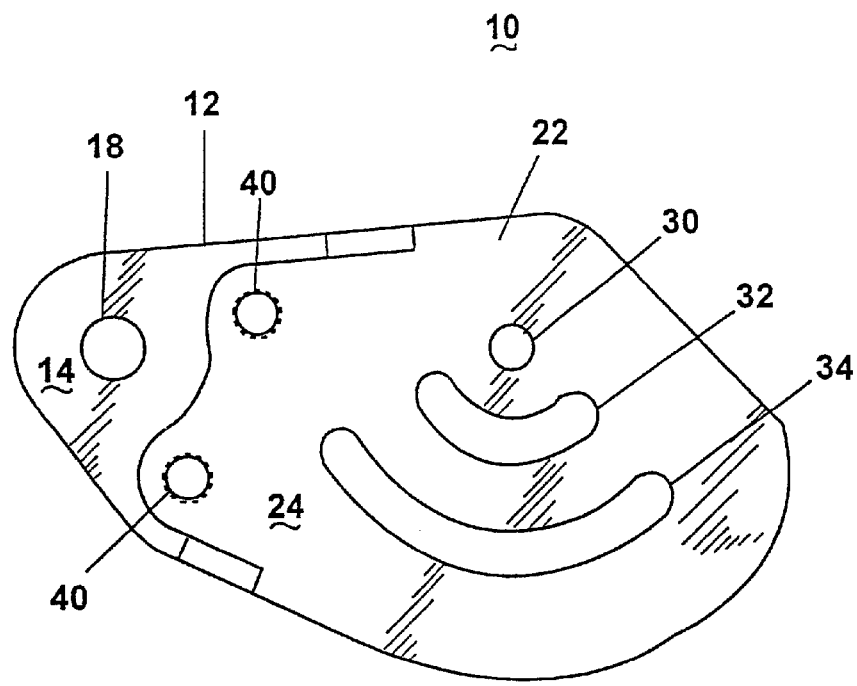
FIG. 3 is a plan view of the universal bracket mount of FIG. 2.
Figure 4:
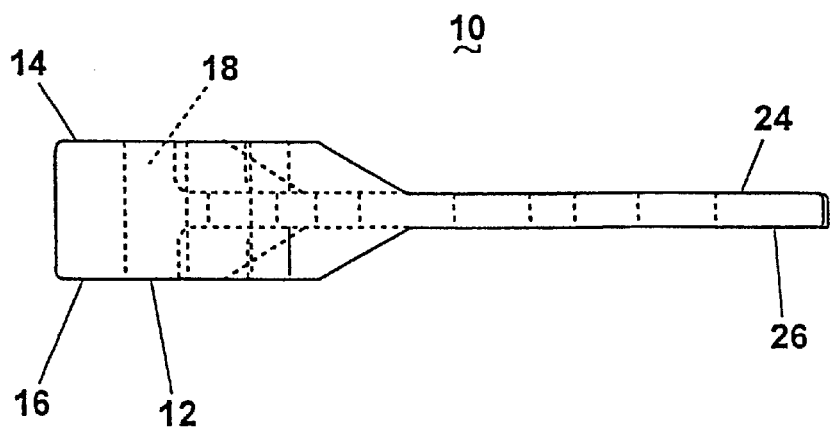
FIG. 4 is a side view of the bracket mount of FIGS. 2 and 3.

FIG. 1 is an exploded perspective view of a bracket mount 10, according to the invention, serving as an interface between a known mudflap bracket 60, carrying a mudflap 64, and a vehicle 100. The bracket mount 10 is adapted to receive the mudflap bracket-mounting studs 62. The bracket mount 10 is secured to the vehicle frame 100 by a bolt 104 and nut 106 passed through a vehicle frame aperture 102.

Referring to FIGS. 1–4, the bracket mount 10 according to the invention comprises a frame mounting block 12 having two opposing parallel planar faces 14, 16, and a frame mounting shaft 18 passing through the frame mounting block 12 transverse to the faces 14, 16.

The bracket mount 10 further comprises a bracket mounting section 20, which comprises a generally planar plate 22 having opposing faces 24, 26, the plate faces 24, 26 being parallel with the faces 14, 16 of the frame mounting block, and the plate 22 being centered between the faces 14, 16 of the frame mounting block 12, in the direction transverse to the faces 14, 16, 24, 26.

The plate 22 has a plurality of apertures passing therethrough. A circular bracket mounting aperture 30, which passes through the plate 22, transverse to the faces 24, 26 of the plate 22, provides a reference point, in the form of a center of rotation for two arcuate bracket mounting slots 32, 34 that also pass through the plate 22 transverse to the faces 24, 26. The first bracket mounting slot 32 is arcuate in nature having as a center of its radius of curvature the center of the bracket mounting aperture 30. The radius of curvature of the first bracket mounting slot 32 is typically about 1.125 inches, corresponding to a common center-to-center distance between studs 62 used to mount mudflap mounting brackets 60 on a vehicle frame 100. In a like manner, the second bracket mounting slot 34 has a radius of curvature of about 2.5 inches, also a common center to center distance between studs 62 used to mount a mudflap mounting bracket 60 on a vehicle frame 100. As would be obvious to one of ordinary skill in the art, the bracket mount 10 can be manufactured using any radius of curvature corresponding to stud separation distances commonly in use in the industry.

At least one separate, threaded set screw aperture 40 is provided through the plate 22. In the illustrated embodiment, two set screw apertures 40 are provided and placed proximate to the frame mounting block 12 of the bracket mount 10. The threaded set screw aperture 40 likewise passes through the plate 22 transverse to the plate faces 24, 26.

In operation, the bracket mount 10 according to the invention, is secured to a vehicle frame 100 by an installer, the installer passing a fastener 104 through the frame mounting shaft 18 in the frame mounting block 12, and through a single aperture 102 in the vehicle frame 100. One face 14, 16 of the block 12 will lay flush against the vehicle frame 100. The plate 22, being thinner than the block 12, and being centered between the faces 14, 16 of the block 12, will be spaced from the vehicle frame surface. The installer of the bracket mount 10 can use this space between the plate 22 and the vehicle frame 100 to access a bolt head or a nut 66 used to install a mudflap bracket 60 on the bracket mount 10. A mudflap bracket 60 typically has a pair of spaced threaded studs/bolts 62 that are adapted to mount the mudflap bracket 60 to a vehicle frame. In installing the mudflap bracket 60 to the bracket mount 10 according to the invention, the installer will attach the bracket 60 to the mount 10 in much the same fashion. The space created between the plate 22 and the vehicle frame 100 allows the installer to access the nuts 66 used with the threaded studs/bolts 62 of the bracket 60. The studs 62 extend through plate 22, where nuts 66 are threaded thereon, securing bracket 60 to mount 10.

The bracket mount 10 is prevented from rotating about the frame mounting shaft 18 by friction between the bracket mount 10 and the vehicle frame, and is further restricted from rotating about the shaft 18 by the insertion of a set screw 42 through the threaded set screw aperture 40 of the bracket mount 10, the end of the set screw bearing against the vehicle frame so as to provide additional resistance to rotation of the bracket mount 10.

The symmetrical nature of the bracket mount 10 provides the advantage of enabling the installer to attach the bracket mount 10 to the vehicle frame 100 in any orientation, i.e., having the shaft 18 at a leading or trailing edge of the installation, with either face 14, 16 abutting vehicle frame 100. The bracket mount 10 is further adapted to be used on the right or left side of a vehicle frame 100.

While the invention has been specifically described in connection with certain specific embodiments thereof, it is to be understood that this is by way of illustration and not of limitation reasonable variation and modification are possible within the scope of the foregoing description and drawings without departing from the spirit of the invention which is defined in the appended claims.

What is claimed is:

1. In combination with a mudflap bracket that is adapted to mount a mudflap thereto, an integral universal mudflap bracket mount mounted to the mudflap bracket for mounting the mudflap to a vehicle frame, the universal mudflap bracket mount comprising:

a frame-mounting block having two opposing block faces and a frame-mounting opening passing through the frame-mounting block transverse to the block faces;

a bracket-mounting plate rigidly joined to the frame-mounting block and having opposing and spaced apart plate faces, at least one of the block faces being spaced outwardly from one of the plate faces to accommodate a bolt head or nut between the plate face and a vehicle frame when the bracket mount is mounted to a vehicle frame; and mudflap bracket fastener openings in the bracket-mounting plate receiving two fasteners of the mudflap bracket and mounting the mudflap bracket to the bracket-mounting plate, at least one of the mudflap bracket fastener openings is arcuate in shape for adjustment of the angular position of the universal mudflap bracket mount with respect to the mudflap bracket.

2. The combination of claim 1 and further comprising a retainer for selectively retaining the combination in a selected orientation with respect to the vehicle frame about an axis passing through the frame-mounting opening.

3. The combination of claim 2 wherein the retainer comprises at least one threaded opening in one of the bracket-mounting plate and the frame-mounting block and a set screw threaded into the threaded opening.

4. The combination of claim 3 wherein the threaded opening is in the bracket-mounting plate.

5. The combination mount of claim 2 wherein the retainer comprises a pair of threaded openings in one of the bracket-mounting plate and the frame mounting block and a set screw threaded into each of the threaded openings.

6. The combination mount of claim 5 wherein the threaded openings are in the bracket mounting plate.

7. The combination of claim 2 and further comprising a fastener in the frame mounting opening.

8. The combination mount of claim 2 wherein one of the block faces is adapted to abut a vehicle frame and a fastener is received in the frame-mounting opening for securing the combination to the vehicle frame.

9. The combination of claim 1 wherein the block faces are each adapted to abut a vehicle frame with a fastener received in the frame-mounting opening for securing the combination to either side of the vehicle frame and in different orientations.

10. The combination of claim 9 and further comprising a retainer for selectively retaining the combination in a selected orientation with respect to the vehicle frame about an axis passing through the frame-mounting opening.

11. The combination of claim 10, wherein the retainer comprises at least one threaded opening in one of the bracket-mounting plate and the frame-mounting block and a setscrew threaded into the threaded opening.

12. The combination of claim 11 wherein the threaded opening is in the bracket-mounting plate.

13. The combination of claim 10 wherein the retainer comprises a pair of threaded openings in one of the bracket-mounting plate and the frame mounting block and set screws threaded into the threaded openings.

14. The combination of claim 13 wherein the threaded openings are in the combinationing plate.

15. The combination of claim 1 wherein the arcuate mudflap bracket fastener opening has a radius of curvature with a center along an axis passing through another of the mudflap bracket fastener openings.

16. The combination of claim 1 wherein there are two arcuate mudflap bracket fastener openings in the bracket mounting plate, each of which has a radius of curvature with a center along an axis passing through another of the mudflap bracket fastener openings.

17. The combination of claim 1 wherein the block surfaces are parallel.

18. The combination of claim 17 wherein another of the block faces is spaced outwardly from the other of the plate faces, the plate faces being substantially equidistant from the frame-mounting block surfaces whereby the combination can be mounted with either side abutting the vehicle frame.

19. The combination of claim 1 wherein the bracket-mounting plate faces are parallel.

20. In combination with a mudflap bracket that is adapted to mount a mudflap thereto, an integral universal mudflap bracket mount mounted to the mudflap bracket and adapted to adjustably mount the mudflap bracket to a vehicle frame, the universal mudflap bracket mount comprising:

a frame-mounting block having opposing block faces and a frame-mounting opening passing through the frame-mounting block transverse to the block faces;

a bracket-mounting plate having opposing plate faces and mudflap bracket fastener openings in the bracket-mounting plate, and receiving two fasteners of the mudflap bracket, the fasteners joining the mudflap bracket to the bracket-mounting plate, at least one of the mudflap bracket fastener openings being arcuate in shape for adjustment of the angular position of the universal mudflap bracket mount with respect to the mudflap bracket;

at least one of the block faces lying in a plane spaced outwardly from the planes of both of the plate faces a distance no less than the depth of a bolt head or nut of a mudflap bracket fastener for accommodating the bolt head or nut between one of the plate faces and a vehicle frame when the universal mudflap bracket mount is mounted to a vehicle frame.

21. A universal mudflap bracket mount for mounting a mudflap bracket to a vehicle frame, the bracket mount comprising:

a frame-mounting block having opposing parallel block faces and a frame-mounting opening passing through the frame-mounting block transverse to the block faces;

a bracket-mounting plate, integral with the frame mounting block, having opposing plate faces and mudflap bracket fastener openings in the bracket-mounting plate for receiving two fasteners of a mudflap bracket for mounting the mudflap bracket to the bracket-mounting plate, at least one of the mudflap bracket fastener openings is arcuate in shape for adjustment of the angular position of the universal mudflap bracket mount with respect to the mudflap bracket and for adjusting the rotational position of the mudflap bracket with respect to the bracket-mounting plate;

wherein the plate faces are in planes that lie between and are spaced from the planes of the block faces a distance no less than the depth of a bolt head or nut to accommodate the heads of the fasteners or nuts of fasteners received in the mudflap bracket fastener openings when the universal mudflap bracket mount is mounted to a vehicle frame and a mudflap bracket is mounted to the universal mudflap bracket mount.

\* \* \* \* \*

UNITED STATES PATENT AND TRADEMARK OFFICE
CERTIFICATE OF CORRECTION

PATENT NO.     : 6,435,462 B2
DATED          : August 20, 2002
INVENTOR(S)    : Timothy R. Hawes It is certified that error appears in the above-identified patent and that said Letters Patent is hereby corrected as shown below:

<u>Column 4,</u>
Lines 5, 9 and 11, "combination mount of" should read -- combination of --
Line 13, "combination mount of" should read -- combination of --
Line 37, "combinationing plate" should read -- bracket mounting plate --

Signed and Sealed this

Fourth Day of February, 2003

JAMES E. ROGAN
*Director of the United States Patent and Trademark Office*